No. 791,553. PATENTED JUNE 6, 1905.
E. F. HARTSHORN.
ATTACHMENT FOR SPRING SHADE ROLLERS.
APPLICATION FILED FEB. 16, 1904.
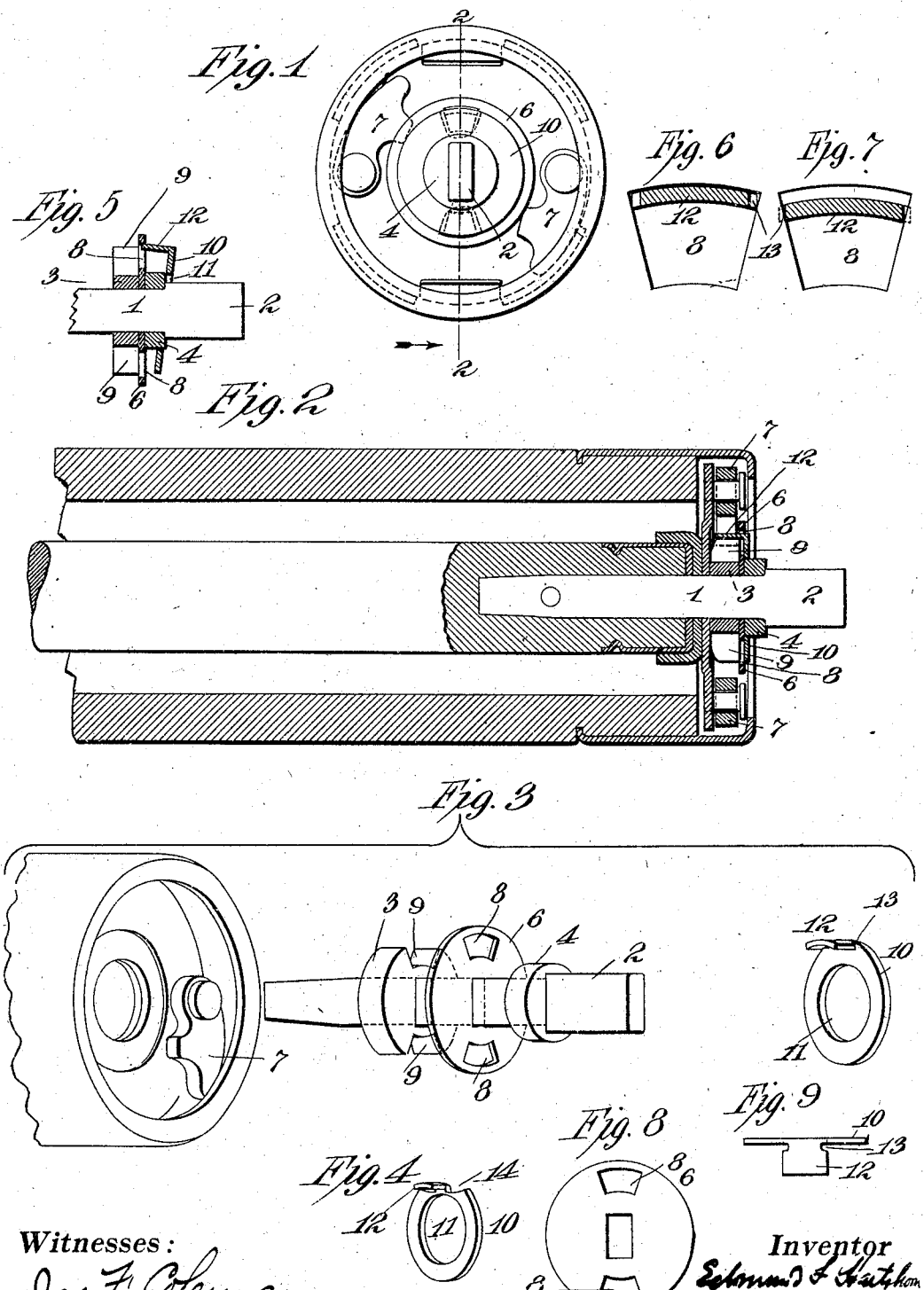
Witnesses:
Jas. F. Coleman
Jno. Robt Taylor
Inventor
Edmund F. Hartshorn
By [signature]
Attorneys.

No. 791,553. Patented June 6, 1905.

UNITED STATES PATENT OFFICE.

EDMUND F. HARTSHORN, OF NEWARK, NEW JERSEY, ASSIGNOR TO STEWART HARTSHORN COMPANY, OF EAST NEWARK, NEW JERSEY, A CORPORATION OF NEW JERSEY.

ATTACHMENT FOR SPRING SHADE-ROLLERS.

SPECIFICATION forming part of Letters Patent No. 791,553, dated June 6, 1905.

Application filed February 16, 1904. Serial No. 193,872.

*To all whom it may concern:*

Be it known that I, EDMUND F. HARTSHORN, a citizen of the United States, residing in the city of Newark, county of Essex, and State of New Jersey, have invented a certain new and useful Improvement in Attachments for Spring Shade-Rollers, of which the following is a description.

The present invention relates to improvements in attachments for spring shade-rollers, and has for its object, first, to provide means to cause the pawl or pawls to track on the periphery of the ratchet-hub; second, to provide means for closing a notch in the ratchet-hub.

In order to better understand the nature of the invention, attention is directed to the accompanying drawings, showing one embodiment of the invention, in which—

Figure 1 is an end view of a roller with the attachment in place. Fig. 2 is a sectional view on the lines 2 2 of Fig. 1. Fig. 3 is a perspective view of one end of a roller with the spear removed, showing the separate parts which form the spear and the locking-washer. Fig. 4 is a perspective view of a modified form of washer. Fig. 5 is a sectional view, on the same plane as Fig. 2, of a part of the spear, showing the locking-washer in the position it assumes when first applied to the spear. Fig. 6 is an enlarged view of the opening in the guide-plate, showing the lip on the locking-washer in section in the position that it will assume when the parts are in the position shown in Fig. 5. Fig. 7 is a view of the same with the parts in the position shown in Fig. 2. Fig. 8 is a front view of the guide-plate, and Fig. 9 is a top view of the locking-washer.

In all of the several views like parts are designated by the same reference-numerals.

In carrying out my invention I provide a spear 1, which may be formed of the rectangular cross-sectional shape illustrated and is provided with a squared portion 2 for engagement with the bracket. Surrounding this spear is a ratchet-hub 3 and, if necessary or desirable, an outer washer 4 on one side thereof. The ratchet-hub and washer when used are preferably cut or stamped out of sheet metal with central openings, so that the constituent parts may be swaged together by means of suitable dies, thus forming the complete spear in a manner similar to that described in my Patent No. 656,288, of August 21, 1900. The ratchet-hub 3 is provided with a guide-flange on the side toward the outer washer 4, so that the pawls 7 7 will always track upon the periphery of the ratchet-hub. This flange is preferably made separately from the ratchet-hub and is in the form of a plate 6, having a central opening which closely surrounds the spear 1 and engages with the latter between the ratchet-hub 3 and the outer washer 4. The plate may be applied by being placed on the spear between the washer 4 and the ratchet-hub and all swaged in position. The plate is of less diameter than the roller, so that the outer portions of the pawls and their supporting-rivets will be exposed to view, as shown in Fig. 1. The plate is provided with two openings 8, which are so arranged as to be adjacent to the notches 9 in the ratchet-hub. These openings are for the purpose of permitting the entrance of a device for covering one or both of the notches and also for the purpose of permitting visual inspection of the pawl when it is in place within a notch, the flange otherwise masking the notch.

In connection with the spear having the guide-plate thereon I may use a washer 10, formed, preferably, of thin tempered steel, with an opening 11, adapted to surround and make a close fit with the outer washer 4. The washer 10 is provided with an integral lip 12, about as wide as one of the openings 8 and sufficiently long so that when the washer 10 is placed upon the washer 4 with the lip through one of the openings 8 this lip will extend inward sufficiently far to cover one of the notches 9, and thereby prevent the pawls from engaging with it. The washer 10 is retained in position after being placed over the washer 4 by the close engagement with the latter and in addition by the engagement of the sides of the lip 12 with the edges of the opening 8. This engagement is increased by forming notches 13 at the base of the lip (see Fig. 9) which will engage with the edges of the opening. One mode of attachment of the washer is illustrated in Figs. 5, 6, and 7. When applied to the spear, the washer is inclined, the lower edge of its central opening 11 being in engagement with the outer washer 4 and the outer edge of the lip 12 entering the upper portion of the opening 8, (see Fig. 6,) the lip being inclined. (See Fig. 5.) By forcing the lower edge of the washer toward the guide-plate until it is in contact therewith the upper edge of the washer may be similarly forced toward the plate, causing the lip to be forced into the opening and becoming horizontal (see Fig. 2) and making the notches 13 engage with the edges of the opening. (See Fig. 7.)

By using the device with fittings in which the outer washer 4 is much larger in proportion to that shown the washer illustrated in Fig. 4 may be employed. In this form the lip 12 is made, not from the periphery of the washer, but from the base of a notch or depression 14, cut in its top, so that when it is bent to the form shown the lip will be much nearer the central opening than is shown in Fig. 3.

The washer may be attached without the need of a tool and when forced in place with the fingers will engage closely with the outer face of the guide-plate 6, so that it will not interfere with the revolution of the roller.

It is to be understood that one of the notches is to be covered by the lip, the other notch being left open, so that the pawls will operate as usual when the open notch is upward when in position in the bracket.

Having now described my invention, what I claim, and desire to secure by Letters Patent, is—

1. In a spring shade-roller, a spear, with a ratchet-hub, a washer and a plate separately formed and swaged thereon, the plate being between the hub and washer, and of larger diameter than the hub, substantially as described.

2. In a spring shade-roller, a spear with a ratchet-hub separately formed and swaged thereon, and a plate surrounding the spear and in engagement with the ratchet-hub on the side away from the roller, the said plate having openings adjacent to the notches in the ratchet-hub, substantially as described.

3. In a spring shade-roller, the combination with a spear having a ratchet-hub thereon, of a pawl engaging therewith, the said hub having a flange on the side away from the roller, the said flange having openings adjacent to the notches in the ratchet-hub, substantially as described.

4. In a spring shade-roller, the combination with a spear having a ratchet-hub thereon, of a pawl engaging therewith, and a washer surrounding the spear, the said washer having a lip which in use will close a notch in the ratchet-hub, substantially as described.

5. In a spring shade-roller, the combination with a spear having a ratchet-hub thereon, of a pawl engaging therewith, the ratchet-hub having a flange on the side away from the roller the said flange having an opening, and a washer surrounding the spear, the said washer having a lip which is adapted to pass through an opening in the flange and cover a notch in the ratchet-hub, substantially as described.

6. In a spring shade-roller, the combination with a spear having a ratchet-hub thereon, of a pawl engaging therewith, a plate, the said plate having an opening and a washer surrounding the spear, the said washer having a lip which is adapted to pass through an opening in the plate and cover a notch in the ratchet-hub, substantially as described.

7. In a spring shade-roller, the combination with a spear having a ratchet-hub thereon, of a pawl engaging therewith, a plate, and a washer surrounding the spear, said plate having an opening, and the washer having a lip with notches on the sides thereof and which is adapted to pass through the opening in the plate and cause the notches to engage with the sides thereof, substantially as described.

This specification signed and witnessed this 10th day of February, 1904.

EDMUND F. HARTSHORN.

Witnesses:
  LEONARD A. DYER,
  JNO. ROBT. TAYLOR.